Patented June 19, 1951

2,557,545

UNITED STATES PATENT OFFICE 2,557,545

VITRIFIABLE ENAMELS FOR THE DECORATION OF GLASS AND METHOD OF MAKING

Frank Enoch Kerridge, London, England, assignor to Johnson, Matthey & Company Limited, London, England, a British company No Drawing. Application February 15, 1949, Serial No. 76,651. In Great Britain December 15, 1947

20 Claims. (Cl. 106—49)

This invention relates to improvements in and relating to vitrifiable enamels adapted for firing onto glass for decorating purposes and is more particularly concerned with white and pastel shade enamels which usually comprise a fusible vehicle, in which is dispersed an opacifying agent and, in the case of a pastel enamel, a small proportion of a colouring base. These enamels may be applied to the glass base in any suitable manner, such as spraying, painting, silk-screen printing or by means of transfers prepared by the lithographic or silk-screen processes and are usually fired at a temperature, which is about 20–30° C. below the softening point of the glass and is within the range of 500–650° C.

In applying these enamels to a glass base so as to form thereon either a continuous film or a design, it is customary to form the enamel into a paste by mixing the previously prepared enamel powder with a medium which preferably contains a bonding agent in order to facilitate the application of the enamel to the base and to ensure that, when the applied film or design is dry, it may be handled without risk of damage.

Various types of medium are in general use and generally comprise an organic solvent mixture in which the bonding agent, which may be a natural or synthetic resin or a cellulose derivative, is dissolved. In the case where the enamel is to be applied as a design by means of a silk-screen transfer, it is necessary to include a relatively high proportion of bonding agent in the vehicle or medium in order to prevent the enamel film from cracking and breaking when it is flexed during the transferring process.

The opacifying agent included in these known enamels may consist of titanium oxide, tin oxide, zirconium oxide, lead molybdate, lead arsenate or lead tungstate or mixtures of two or more thereof.

The results obtainable with white and pastel shade enamels of the above kind have not, for various reasons, proved entirely satisfactory. If titanium oxide is used as the opacifier, an acid-type flux is required, which is liable to cause pinholing and shrinkage during firing, which reduces its usefulness for use with silk-screen transfers. Moreover, enamels containing titanium oxide are frequently deficient in gloss and tend to assume a yellow colouration if fired at a temperature above the maturing temperature of the enamel.

The use of tin oxide or zirconium oxide opacifiers has the disadvantage that, as they are soluble to an appreciable extent in lead-borosilicate fluxes, it is necessary, in order to obtain an opaque enamel, to use excessive quantities of the opacifier, which renders the enamel costly. Moreover, such enamels have not hitherto proved efficient as glass enamels.

The other opacifiers mentioned, whilst they will, under certain conditions, produce very opaque enamels, have not been used extensively in glass enamels for various reasons. One important reason is that the presence of carbon, resulting from the decomposition, during the firing operation, of the bonding agent in the medium, has a detrimental effect on the enamel causing chemical reduction resulting in bubbling, loss of opacity and greyness in the fired enamel. This disadvantage is particularly liable to occur if the enamel is applied as a silk-screen transfer, the support film of which usually consists of a plasticised cellulose derivative, which on combustion during the firing will give rise to additional carbon.

The principal object of this invention is to provide a novel enamel for the decoration of glass, particularly by means of transfers prepared by the silk-screen process, which does not suffer from the disadvantages inherent in the hitherto known glass enamels and enables an opaque white or pastel shade decoration, which is of lasting quality, to be obtained.

Another object of the invention is to provide a vitrifiable enamel for decorating glass, which includes ceric oxide ground in with the previously fritted flux.

Another object of the invention is to provide an enamel which comprises a lead-borosilicate or lead-alkali borosilicate flux and an opacifier in which is incorporated ceric oxide.

A further object is to provide a glass enamel comprising a lead-borosilicate flux, lead molybdate, arsenate or tungstate or mixtures thereof and up to 10% of ceric oxide.

Another object of the invention is to provide an enamel for glass decoration comprising a lead borosilicate or lead alkali borosilicate flux, lead molybdate, arsenate or tungstate as opacifier and ceric oxide, the opacifier and ceric oxide being ground in with the previously fritted flux.

The lead molybdate, arsenate or tungstate may be introduced as such into the enamel or may be formed in situ during the firing of the enamel by including the oxides or other compounds of arsenic, molybdenum and/or tungsten as initial ingredients before firing.

If a pastel shade decoration is required a small proportion of a suitable colouring base or pigment, such as cobalt aluminate to produce a blue shade, may be incorporated.

Other metal oxides, such as zirconium oxide or titanium oxide may also be included, if desired, in order to improve the durability of the enamel.

A suitable flux for forming an enamel in accordance with the invention may have the following composition by weight, namely:

| | |
|---|---|
| Lead monoxide (PbO) | 64.9% |
| Silica (SiO$_2$) | 26.2% |
| Boric oxide (B$_2$O$_3$) | 5.2% |
| Soda (Na$_2$O) | 3.7% |

The constituents required to produce this flux are melted together at red heat.

To produce an opaque white enamel, 95.5 parts of this flux are ground in with 4.5 parts of molybdic oxide and 5 parts of ceria.

The enamel may, however, also be produced by melting the molybdic oxide with the flux ingredients, grinding finely, roasting at a temperature of 500–650° C., adding 5% of ceria and finally regrinding.

The final mixture, prepared by either of the above methods is then mixed with a suitable organic medium, such as a plasticized solution of nitro-cellulose in amyl lactate, preferably in the proportion of 3.5 parts of enamel to one part of medium, to form a paste suitable for use for preparing a transfer by the silk-screen printing process and is ready for use.

It has been found that the ceric oxide must be added to the previously fritted flux and not included as an original ingredient. Although the action of the ceric oxide in these enamels is not fully understood, it is thought that, during firing, it is reduced to the cerous condition, with consequent liberation of oxygen, which assists the oxidation of the carbon present in the medium, and, in the case where the enamel is applied by means of a transfer, in the support film also.

Whatever the true action of the ceric oxide may be, it will be found that white and pastel shade enamels embodying the invention and used in media containing organic bonding agents do not, when fired, suffer loss of opacity and develop bubbles as do the enamels hitherto used.

What I claim is:

1. A glass enamel comprising a mixture of a lead borosilicate flux, from 1–10% by weight of molybdic oxide and 5% by weight of ceric oxide.

2. A vitrifiable glass enamel comprising 95.5 parts by weight of a flux selected from the group consisting of lead borosilicate and lead alkali borosilicate, 4.5 parts by weight of molybdic oxide and 5 parts by weight of ceria.

3. A method of making a vitrifiable enamel for the decoration of glass, which comprises the steps of (1) preparing a flux mixture having the following composition in the following proportions, namely: lead monoxide (PbO) 64.9%, silica (SiO$_2$) 26.2%, boric oxide (B$_2$O$_3$) 5.2% and soda (Na$_2$O) 3.7%, (2) melting the mixture at red heat and grinding in with 95.5 parts of the resultant fritted flux, 4.5 parts of molybdic oxide and 5 parts of ceric oxide.

4. A method of making a vitrifiable enamel for the decoration of glass which comprises the steps of: (1) mixing together the constituents of a flux selected from the group consisting of lead borosilicate and lead alkali borosilicate and molybdic oxide, (2) fritting said mixture, (3) grinding the resultant frit, (4) roasting the mixture, (5) adding about 5% of ceric oxide and (6) finally regrinding.

5. A low melting vitrifiable enamel for firing onto glass in admixture with a carbonaceous medium, said enamel comprising essentially a mechanical mixture of (a) a flux selected from the group consisting of lead borosilicate and lead alkali borosilicate fluxes, (b) an opacifying agent comprising at least one compound selected from the group consisting of the compounds of molybdenum, arsenic and tungsten, and (c) ceric oxide for preventing chemical reduction of said flux and opacifier by carbonaceous residue from the medium produced during the firing of said enamel.

6. A glass article decorated with the enamel according to claim 5.

7. A glass enamel as claimed in claim 5 wherein the opacifier contains lead molybdate.

8. A glass enamel as claimed in claim 5 wherein the opacifier contains lead arsenate.

9. A glass enamel as claimed in claim 5 wherein the opacifier contains lead tungstate.

10. A low melting vitrifiable enamel for firing onto glass in admixture with a carbonaceous medium, said enamel comprising essentially a mechanical mixture of (a) a frit consisting of a flux selected from the group consisting of lead borosilicate and lead alkali borosilicate fluxes and at least one opacifying agent comprising a compound selected from the group consisting of the compounds of molybdenum, arsenic and tungsten, and (b) ceric oxide for preventing chemical reduction of said enamel by carbonaceous residue from the medium produced during the firing of said enamel.

11. A low melting vitrifiable enamel for firing onto glass in admixture with a carbonaceous medium, said enamel comprising essentially a mechanical mixture of (a) a flux selected from the group consisting of lead borosilicate and lead alkali borosilicate fluxes, (b) an opacifying agent comprising at least one compound selected from the group consisting of the compounds of molybdenum, arsenic and tungsten and (c) ceric oxide for preventing chemical reduction of said flux and opacifier by carbonaceous residue from the medium produced during the firing of the enamel, said ceric oxide constituting not more than 10% by weight of the enamel.

12. A low melting vitrifiable enamel for firing onto glass, in admixture with a carbonaceous medium, said enamel comprising essentially a mechanical mixture of (a) a flux selected from the group consisting of lead borosilicate and lead alkali borosilicate fluxes, (b) from 1–10% of an opacifying agent comprising at least one compound selected from the group consisting of the compounds of molybdenum, arsenic and tungsten and (c) ceric oxide for preventing chemical reduction of said flux and opacifier by carbonaceous residue from the medium produced during the firing of said enamel, said ceric oxide constituting not more than 10% by weight of the enamel.

13. In a liquid mixture having a carbonaceous medium, for the decoration of a glass, a vitrifiable enamel consisting essentially of a mechanical mixture of a flux selected from the group consisting of lead borosilicate and lead alkali borosilicate fluxes, an opacifying agent selected from the group consisting of the compounds of molybdenum, arsenic, and tungsten, and an inhibitor for preventing chemical reduction of said flux by carbonaceous residue produced from the medium during firing consisting of ceric oxide.

14. In a method of making a low melting vitrifiable enamel for firing onto glass in admixture with a carbonaceous medium, said enamel comprising a fritted flux selected from the group consisting of lead borosilicate and lead alkali borosilicate fluxes, and an opacifying agent selected from the group consisting of the compounds of molybdenum, arsenic and tungsten, the improvement which consists in grinding in, with the fritted flux, ceric oxide, to prevent chemical reduction of the flux and opacifier by carbonaceous residue from the medium produced during firing of the enamel.

15. A method as claimed in claim 14 wherein the opacifier includes lead molybdate.

16. A method as claimed in claim 14 wherein the opacifier includes lead arsenate.

17. A method as claimed in claim 14 wherein the opacifier includes lead tungstate.

18. A method as claimed in claim 14 wherein from 1-10% of opacifier is included.

19. A method as claimed in claim 14 wherein up to 10% of ceric oxide is included.

20. In a method of making a low melting vitrifiable enamel for firing onto glass in admixture with a carbonaceous medium, said enamel comprising a fritted mixture of a flux selected from the group consisting of lead borosilicate and lead alkali borosilicate and an opacifying agent selected from the group consisting of the compounds of molybdenum, arsenic and tungsten, the improvement which consists in grinding in with the frit ceric oxide to prevent chemical reduction of the flux and opacifier by carbonaceous residue from the medium produced during firing of the enamel.

FRANK ENOCH KERRIDGE.

REFERENCES CITED

The following references are of record in the file of this patent:

UNITED STATES PATENTS

| Number | Name | Date |
|---|---|---|
| 2,267,928 | Kreidl | Dec. 30, 1941 |

FOREIGN PATENTS

| Number | Country | Date |
|---|---|---|
| 85,519 | Switzerland | 1920 |

OTHER REFERENCES

Ser. No. 335,627, Paquet (A. P. C.), published June 1, 1943.